United States Patent [19]

McCaffrey

[11] Patent Number: 5,533,677
[45] Date of Patent: Jul. 9, 1996

[54] METHOD AND APPARATUS FOR SPREADING MATERIAL

[76] Inventor: Kent McCaffrey, P.O. Box 70, Stanley, Va. 22851

[21] Appl. No.: 531,915

[22] Filed: Sep. 21, 1995

Related U.S. Application Data

[63] Continuation of Ser. No. 118,755, Sep. 10, 1993, abandoned.
[51] Int. Cl.[6] .................................................. A01C 19/00
[52] U.S. Cl. ............................ 239/677; 239/680; 239/684
[58] Field of Search .............................. 239/1, 650, 654, 239/655, 659, 663, 668, 669, 670, 671, 672, 674, 677, 679, 680–684, 685

[56] References Cited

U.S. PATENT DOCUMENTS

| | | | |
|---|---|---|---|
| 2,094,572 | 9/1937 | Hendricks et al. | 239/677 |
| 2,099,369 | 11/1937 | Lutz | 239/670 |
| 2,484,325 | 10/1949 | Wachter | 239/685 |
| 3,313,549 | 4/1967 | Bell | 239/682 X |
| 3,417,926 | 12/1968 | De Vorak | 239/682 X |
| 3,448,930 | 6/1969 | Lepp et al. | 239/685 |
| 3,507,452 | 4/1970 | Dreyer | 239/682 |
| 3,730,395 | 5/1973 | Gallogly et al. | 239/655 |
| 4,098,433 | 7/1978 | Oligschlaeger | 239/677 X |
| 4,350,303 | 9/1982 | van der Lely | 239/682 X |
| 4,442,979 | 4/1984 | Kupper | 239/677 X |
| 4,609,153 | 9/1986 | van der Lely | 239/670 X |
| 4,673,131 | 1/1987 | Travis | 239/682 X |
| 4,700,895 | 10/1987 | Takata | 239/677 X |
| 4,917,652 | 4/1990 | Glaubitz et al. | 239/682 X |
| 5,021,030 | 6/1991 | Halford et al. | 239/682 X |

FOREIGN PATENT DOCUMENTS

| | | | |
|---|---|---|---|
| 2355088 | 5/1975 | Germany | 239/671 |
| 1687056 | 10/1991 | U.S.S.R. | 239/680 |
| 2173682 | 10/1986 | United Kingdom | 239/679 |

*Primary Examiner*—Andres Kashnikow
*Assistant Examiner*—Lesley D. Morris
*Attorney, Agent, or Firm*—Fisher & Associates

[57] ABSTRACT

A method and apparatus for spreading material including a container for the material to be spread; the container includes an open top for receiving the material, a front wall, a rear wall, a left side wall, a right side wall, and a bottom; apparatus adjacent the container bottom for moving the material along the container bottom in a direction from the front wall toward the rear wall; openings provided in the left and right side walls adjacent the container bottom and the rear wall for permitting the material to be discharged from the container; an auger adjacent the container bottom and rear wall for moving the material toward the openings; a first material spreader located outside of the container adjacent to the left side wall for receiving material discharged from the opening in the left side wall; a second material spreader located outside of the container adjacent the right side wall for receiving material discharged from the opening in the right side wall; and apparatus for rotating the first and second material spreaders in such a manner as to spread the material in an even pattern outwardly of the side walls and rearwardly of the rear wall.

19 Claims, 4 Drawing Sheets

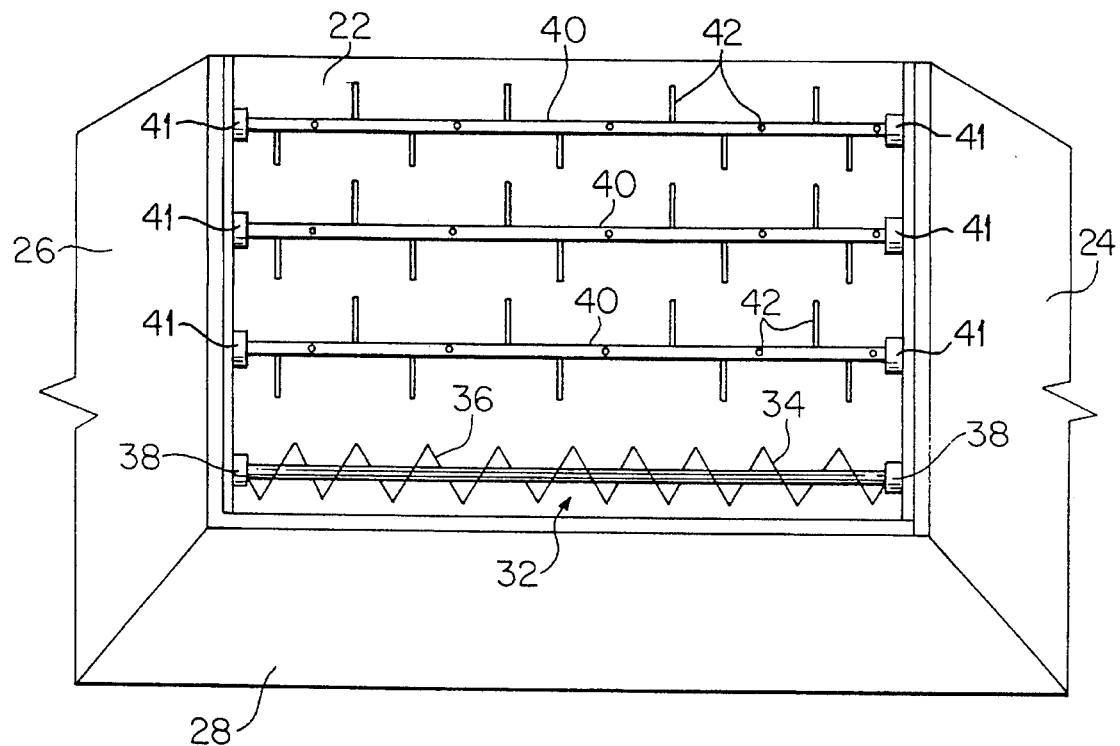
FIG. 3
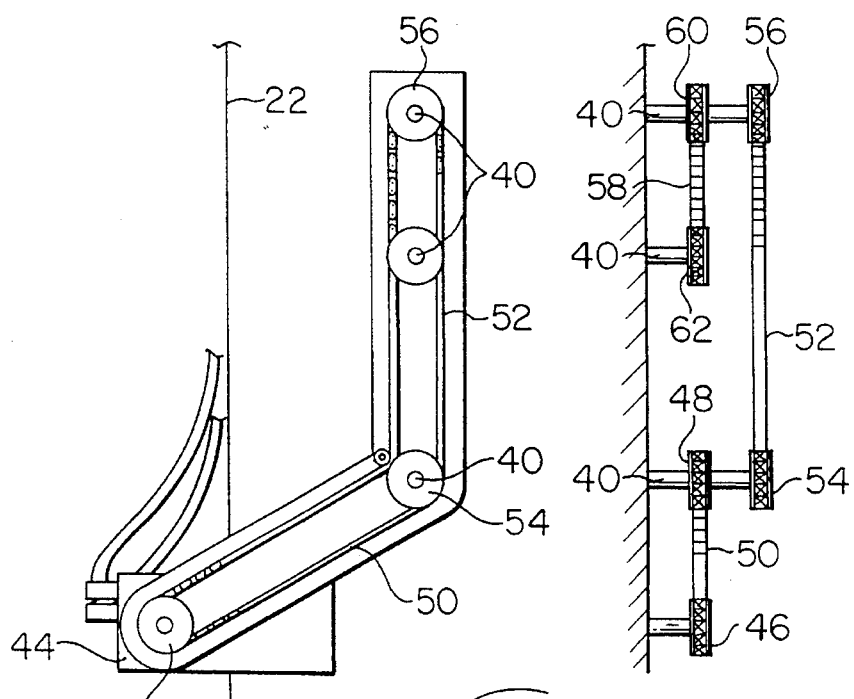
FIG. 4
FIG. 5

METHOD AND APPARATUS FOR SPREADING MATERIAL

This application is continuation of application Ser. No. 08/118,755, filed Sep. 10, 1993, now abandoned.

BACKGROUND OF THE INVENTION

1. Field of the Invention

The present invention relates generally to a method and apparatus for spreading material, and more particularly to a mobile apparatus for transporting materials and spreading the same in an even widely dispersed pattern and a method therefor.

2. Description of the Prior Art

It is well known in the art that in the raising of chickens in large facilities, a ground cover is conventionally provided. Such ground cover is known as litter and is for the collection and absorption of chicken waste. Conventionally, such litter is delivered to a facility which is intended to contain the chickens and is dumped in piles inside or outside of the facility to be spread by hand. It is obviously desirable to have the litter spread as evenly throughout the facility as possible so as to completely cover the ground within the facility without creating waste.

It has been known in the prior art to use blowing or spreading equipment for such litter, but such prior art methods and apparatus have generally been incapable of efficiently and economically spreading such materials in an even and completely covering matter.

SUMMARY OF THE INVENTION

It is therefore an object of the present invention to provide a method and apparatus for transporting and spreading litter for a chicken raising facility wherein the resulting layer of litter within the facility is of essentially even depth and provides essentially complete coverage of the ground portion of the facility.

A further object of this invention is to provide the trailer portion of a truck with apparatus capable of moving the contents of the truck from the front portion thereof to the rear portion thereof and to discharge and spread the material externally of the rear portion of the truck in an even pattern as the truck moves in a forward direction.

It is a still further object of this invention to provide a method and apparatus for discharging and spreading chicken litter from a truck to provide ground cover for a chicken growing facility in an even and consistent layer which fully covers the ground within the chicken growing facility.

BRIEF DESCRIPTION OF THE DRAWINGS

The invention will be further described in conjunction with the accompanying drawings, in which:

FIG. 3 is a partial view of the back wall of the trailer, illustrated in FIG. 1, as viewed from the inside;

FIG. 4 is a partial side view of a sprocket and chain arrangement for driving components of the present invention;

FIG. 5 is a partial front view of the sprocket and chain arrangement of FIG. 4;

DETAILED DESCRIPTION OF THE PREFERRED EMBODIMENT

Figure 1:
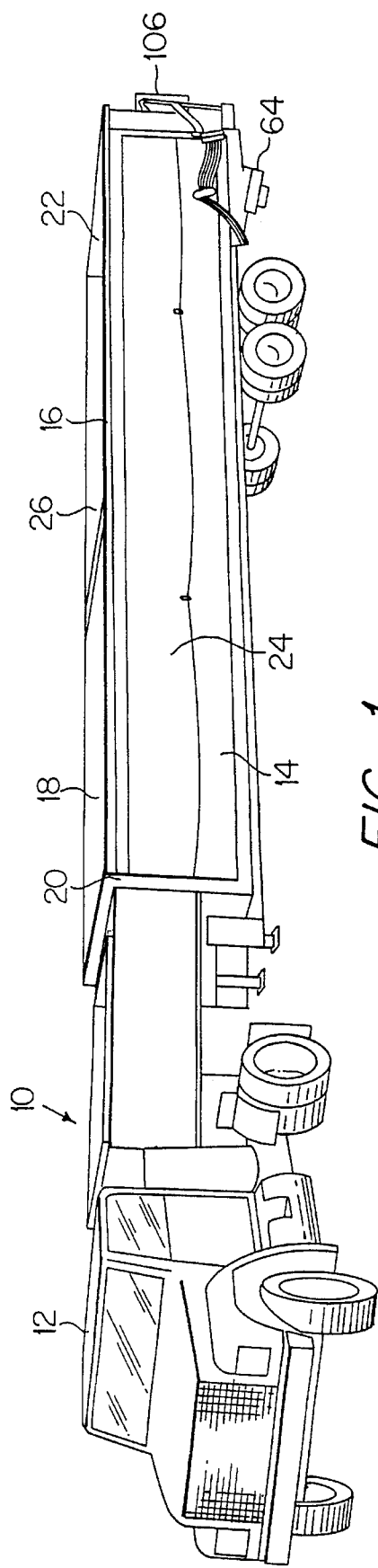
FIG. 1 is an orthogonal view of a tractor trailer encompassing the apparatus of the present invention.

With reference to the drawings wherein like reference characters indicate like elements throughout the several views and, in particular, with reference to FIG. 1, wherein there is shown a tractor trailer truck 10 having a cab 12 and a trailer portion 14. The trailer portion 14 has a height which is essentially the same as the cab 12 of the truck. The total length of the tractor trailer is approximately 60 feet and the width of the truck is approximately 96 inches. The top 16 of the trailer portion 14 is open so as to receive material therein capable of filling the entire trailer. A tarpaulin 18 is provided for covering the top 16 of the trailer during transporting.

The tractor trailer truck 10, as illustrated in FIG. 1, is specifically designed to carry material which is to be spread as a ground cover. In particular, within the scope of the present invention, it is contemplated that the tractor trailer 10 would be utilized for transporting and spreading litter which is conventionally used as a ground cover in a facility or house for the raising of poultry. Many different materials have been utilized as litter in poultry facilities such, for example, as wood shavings, peanut hulls, shredded paper and the like. Although the description of the preferred embodiment relates specifically to poultry litter, the present invention could readily be utilized for the spreading of manure in open fields as well as agricultural chemicals and other materials.

The tractor trailer 10 as illustrated in FIG. 1, is of a conventional American style left-hand wheel drive, and all components described in the specification hereof are described as having a left side which is that side of the truck commonly referred to as the driver side. The trailer portion 14 is a container for the material to be spread and includes a front wall 20, a rear wall 22, a left side wall 24, a right side wall 26, and a bottom 28.

Figure 2:
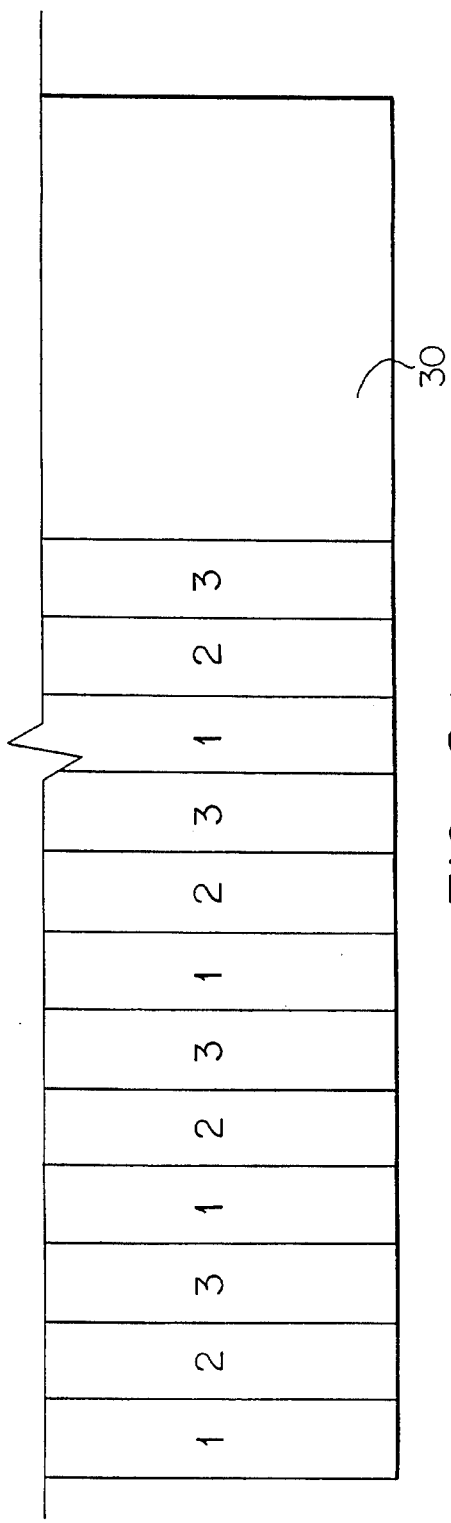
FIG. 2 is a schematic view of a portion of the floor of the trailer illustrated in FIG. 1.
Figure 6:
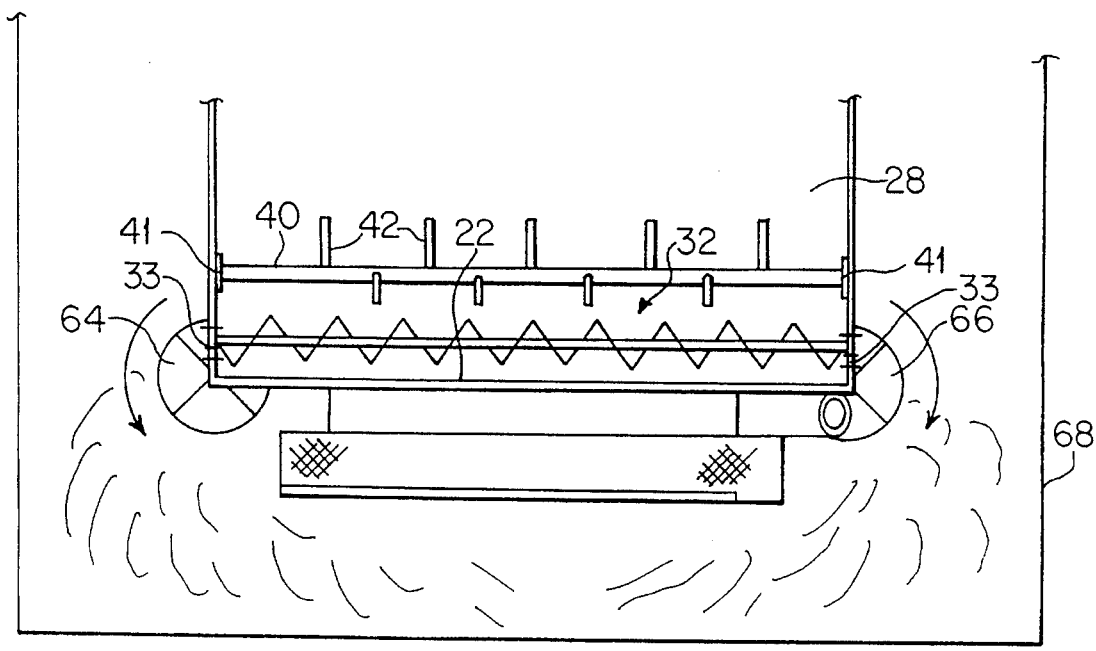
FIG. 6 is a partial top schematic view of the rear portion of the apparatus of the present invention in operation.

The inside of the bottom 28 of the trailer 14 is equipped with a "KEITH" two-way walking floor. The walking floor as designated generally by the reference numeral 30 in FIG. 2, is of a conventional type including a series of slats, in sets of three, extending from the front to the back portion of the trailer 14. The basic operation of the walking floor 30 is illustrated in FIG. 2 wherein hydraulic means are utilized for moving the slats indicated by the numbers 1, 2, and 3. The slats are numbered from left to right; 1, 2, 3; 1, 2, 3; 1, 2, 3. All of the "1" slats will move forward at the same time, after which all of the "2" slats will move forward, followed by all of the "3" slats. Since two of the three slats are not moving while every third slat is moving forward, then the coefficient of friction is two to one to hold the material in place and not move the material forward. However, once all the slats are in the forward position, then all slats simultaneously move to the rear, thus dragging the material supported thereon towards the back of the truck. In this manner, the clean litter, such as pine shavings, will incrementally and continuously move from the front to the back of the truck.

At the intersection of the rear wall 22 and the bottom 28 of the trailer portion 14 is located an auger 32 having an auger left portion 34 and an auger right portion 36. The pitch of auger left portion 34 is opposite to that of auger right portion 36 such that material fed into the auger will move outwardly of the center portion of the auger in both directions when the auger is rotated in a first direction, and will move inwardly towards the center of the auger from both directions when the auger is rotated in an opposite direction. Auger 32 is supported in conventional bearings 38 at both ends thereof.

A plurality of beater bars 40 are rotatably supported above auger 32 and slightly more forward of rear wall 22 than the auger 32. The beater bars 30 are vertically aligned and are supported in bearings 41. Each of the beater bars includes a plurality of radially spaced beater rods 42 extending along the length thereof.

The beater bars 40 extend through the right side wall 24 of the trailer portion 14 as shown in FIGS. 4 and 5. A hydraulic motor 44 is provided for rotating the three beater bars 40 through a first sprocket 46. First sprocket 46 is connected to a second sprocket 48 mounted on the lower beater bar by means of a first chain 50. A second chain 52 interconnects a third sprocket 54 and a fourth sprocket 56 respectively mounted on the outer portion of the lower and upper beater bars 40. A third chain 58 interconnects a fifth sprocket 60 located on the upper beater bar with a sixth sprocket 62 located on the middle beater bar. Through this arrangement of sprockets and chains, the three beater bars 40 are all rotated through activation of the hydraulic motor 44.

The beater bars 40 are designed with beater rods 42 so as to continuously lift or fluff the material at the bottom end of the truck in order to prevent compacting. The auger 32 is a split auger having a left portion 34 and a right portion 36 which moves the material from the center towards the outside walls of the truck. There are openings at the end of the auger which may be covered by doors 33 through which the clean litter exits the rear bottom portion of the truck on both sides thereof. The clean litter as it exits the truck by means of auger 32 is fed into a spreader 66 on the left side of the truck and a spreader 64 on the right side of the truck. Spreaders 64 and 66 are of the "CHANDLER" type such that the clean litter may be thrown outwardly toward the side walls of a poultry facility 68 as well as into the corners and center back wall portion thereof. The left spreader 66 is rotated in a counter clockwise direction while the right spreader 64 is rotated in a clockwise direction. With the spreaders being located at the outward rear portion of the truck and rotated in the directions indicated above, the clean litter is spread in a relatively even thickness throughout the entire floor area of the chicken facility producing a carpet-like effect.

In actual operation, the entire truck is backed into the chicken facility, and as the clean litter is being spread against the back wall of the poultry facility, the truck will move forward towards the open front end of the chicken facility very slowly so that a relatively even and continuous carpet of material is produced. The carpet of material may be over a clean floor or it may be over a bed of soiled litter. The poultry facility may be as wide as 50 feet and thus placing the spreaders 64 and 66 on the rear outer corners of the truck and utilizing the direction of rotation indicated above, only two spreaders are needed in order to get a complete carpeting of the material throughout the facility with one pass.

Figure 7:
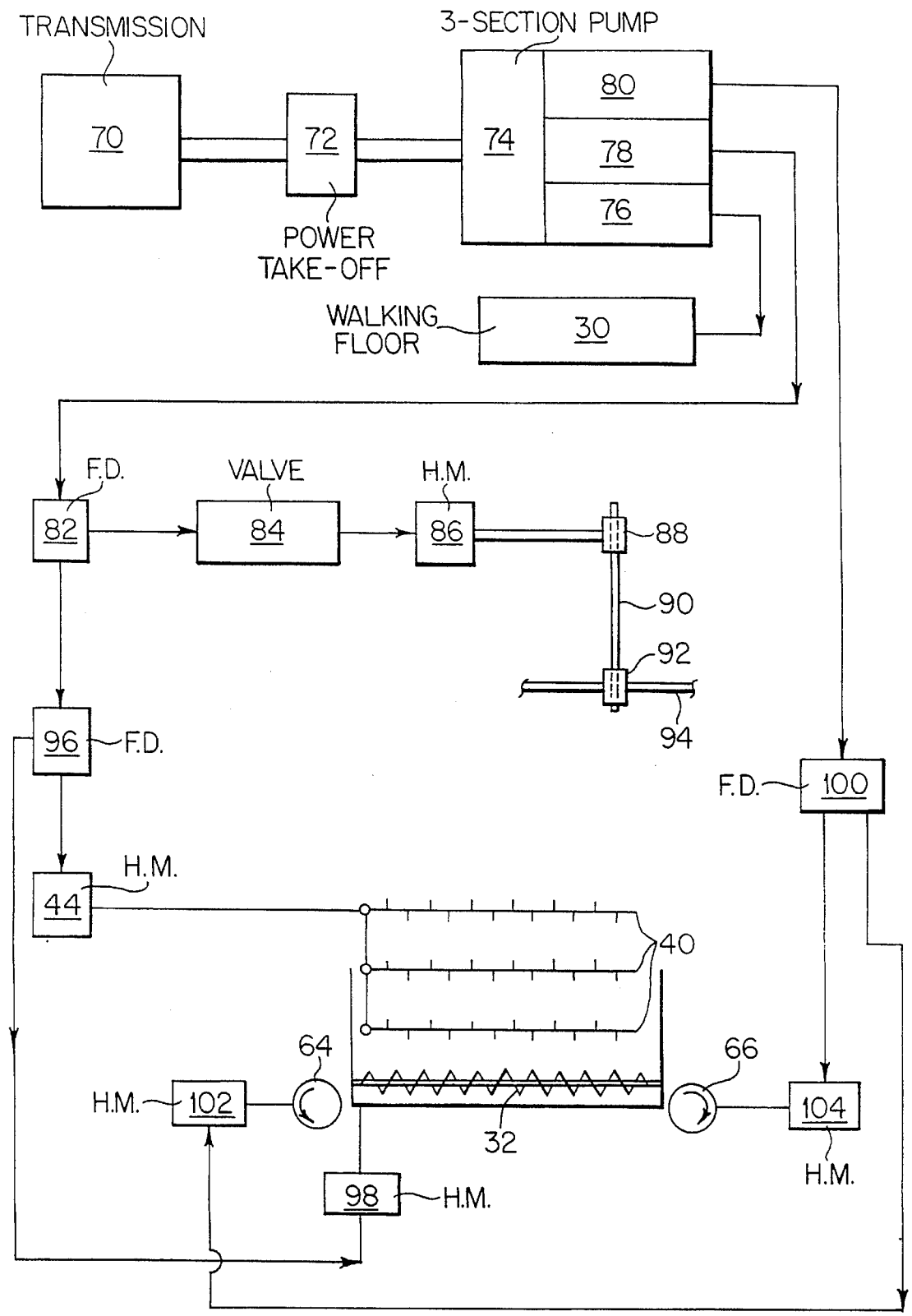
FIG. 7 is a schematic view of the hydraulic system of the present invention.

Referring now to FIG. 7 wherein there is shown a hydraulic system for carrying out the method and apparatus of the present invention. The engine of truck 10 runs during the entire operation of the material spreading and powers a truck transmission 70 having a power take-off 72. Power take-off 72 drives a three section pump 74 including a first pump section 76 having a capacity of 15 gallons per minute, and second and third pump sections 78 and 80 each having a capacity of 30 gallons per minute.

The first pump section 76 drives the walking floor 30. The second pump section 78 provides hydraulic pressure to flow divider 82. The hydraulic fluid passes through a pressure compensated valve 84 to a hydraulic motor 86. The hydraulic motor 86 rotates a sprocket 88 which rotates a second sprocket 92 through a chain 90. Sprocket 92 is mounted on the drive shaft 94 of truck 10. By adjusting valve 84, the rotational speed and direction of the drive shaft 94 may be controlled so as to move the truck 10 in a forwardly or rearwardly direction during the spreading of the material. A second path from the flow divider 82 proceeds to another flow divider 96 having a first path for operating hydraulic motor 44 which in turn rotates the beater bars 40. A second path from the flow divider 96 drives still another hydraulic motor 98 for rotating the auger 32. The third pump section 80 has a hydraulic path to a flow divider 100 which has a first hydraulic path to a hydraulic motor 102 and a second hydraulic path to a hydraulic motor 104 for rotating the left spreader 66 and right spreader 64 respectively. The hydraulic motors 102 and 104 may be "TYRONE UM16-100C-SD4" type. The hydraulic motors 98 and 44 may be "CHAR-LYNN MOTOR 103-1031-005" type.

Utilizing the above described hydraulic system of FIG. 7, it may be seen that while the truck engine is running, truck 10 may be moved forward at a controlled rate by adjusting valve 84. As the truck 10 moves forward, for example out of a poultry facility, the walking floor 30 is functioning through pump section 76 to move material in the truck from the front to the back portion of the truck. Furthermore, the beater bars 40 and auger 32 are rotated so as to feed the material outwardly of the truck into the left and right spreaders 64 and 66 which in turn are operated through the pump section 80.

Figure 8:
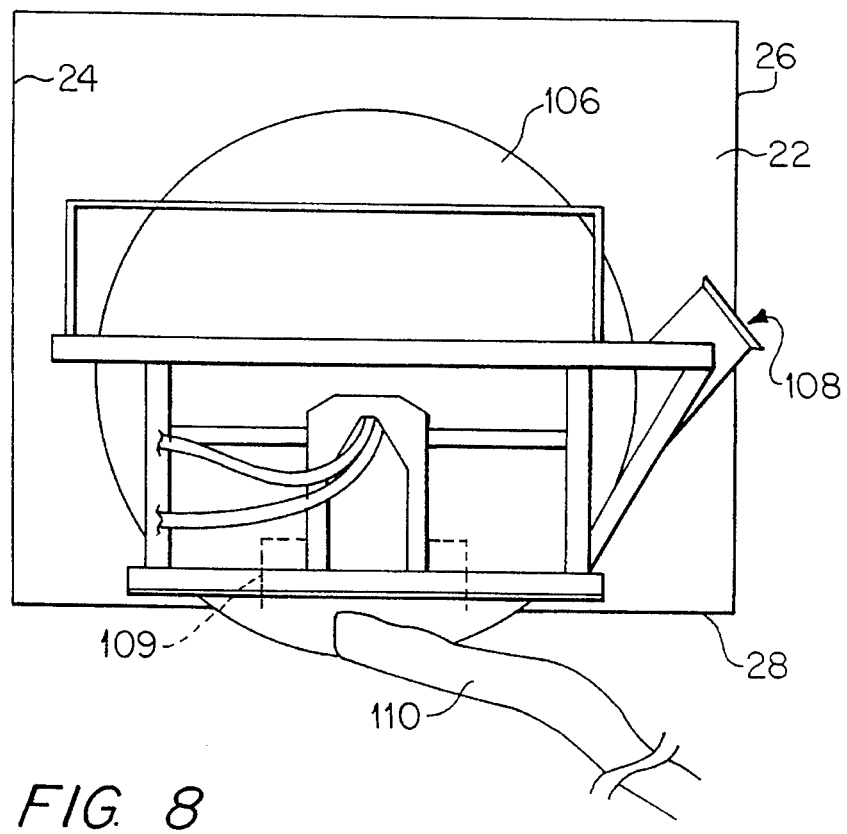
FIG. 8 is a partial rear view of the trailer shown in FIG. 1.

By closing the doors 33 which permit material to enter the spreaders 64 and 66, and opening a door 109 at the lower central portion of the back wall 22 of the trailer, material in the truck is provided with means for exit thereof. By reversing the auger 32 so as to feed from the side walls 22 and 26 toward the center, the material will exit the truck from the lower back central position to be fed into a blower 106, as illustrated in FIG. 8. Blower 106 includes an air inlet 108 and an outlet hose 110. The outlet hose 110 can be utilized for blowing loose materials which are exiting the truck into a loft or other space which the truck could not otherwise enter.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. Apparatus for spreading material as a ground cover for the floor of a facility comprising:

a container for said material to be spread, said container comprising an open top for receiving said material, a front wall, a rear wall, a left side wall, a right side wall, and a bottom, said left and right side walls being defined as corresponding to an American style left-hand wheel drive system where said left side corresponds to a driver's side, said container having a centerline extending from said front wall to said rear wall;

first means adjacent said container bottom for moving said material along said container bottom in a direction from said front wall toward said rear wall;

at least two openings provided in said container adjacent said container bottom and adjacent or in said rear wall for permitting said material to be discharged from said container, said at least two openings being disposed so as to have a first opening disposed to the left of said centerline and a second opening disposed to the right of said centerline;

second means adjacent said container bottom and said rear wall for moving said material toward said openings;

a first material spreader located outside of said container and disposed to the left of said centerline for receiving material discharged from said first opening;

a second material spreader located outside of said container and disposed to an right of a centerline for receiving material discharged from said second opening;

means for rotating said first and second material spreaders in such a manner as to spread said material in a pattern outwardly of said side walls and rearwardly of said rear wall, said pattern being of essentially even depth of material covering essentially the entire floor of said facility in a single pass, said first material spreader being rotated about an essentially vertical axis in a counter-clockwise direction and said second material spreader being rotated about an essentially vertical axis in a clockwise direction;

transport means on which said apparatus is mounted for moving said apparatus into and out of said facility; and hydraulic means for controlling the relative speeds of movement of said transport means moving said apparatus out of said facility and said second means for moving said material with the speed of rotation of said first and second spreaders so as to spread an even layer of said material in said facility.

2. Apparatus for spreading material in accordance with claim 1 further comprising:

means adjacent said rear wall for lifting and preventing compacting of said material.

3. Apparatus for spreading material in accordance with claim 1 wherein said means for moving said material toward said openings comprises:

an auger having a left portion and a right portion, said left and right portions having opposite pitch such that rotation of said auger causes said material to move toward said left and right side walls when said auger is rotated in a first direction and away from said left and right side walls when said auger is rotated in a second opposite direction.

4. Apparatus for spreading material according to claim 2 wherein said material lifting means comprises:

a plurality of vertically aligned rotatable bars each having a plurality of rods radially extending therefrom.

5. Apparatus for spreading material according to claim 1 further comprising:

an opening in said rear wall for permitting material to be discharged from said container; and a blower affixed to the outer surface of said rear wall for receiving material discharged from said rear wall and spreading said material outwardly of said container.

6. Apparatus for spreading material according to claim 1 wherein said transport means is a tractor trailer type truck, and said container is a trailer portion of said tractor trailer type truck and wherein the height of said trailer is essentially equal to a cab portion of said tractor trailer.

7. Apparatus for spreading material according to claim 6 wherein said tractor trailer truck includes a drive shaft and said hydraulic control means includes means for controlling the rotational speed of said drive shaft in such a manner as to move said truck in a forwardly or rearwardly direction during spreading of said material relative to the speed of movement of said second means for moving said material and the speed of rotation of said first and second material spreaders.

8. Apparatus for spreading material according to claim 7 said hydraulic control means further includes a hydraulic circuit having means for rotating an auger, means for rotating said first and second material spreaders, means for operating said means for moving said material along said container bottom, and means for rotating said drive shaft.

9. The apparatus for spreading material recited in claim 1 wherein said first opening is through said left side wall and said second opening is through said right side wall.

10. A method of spreading clean litter as a ground cover for a poultry facility comprising the steps of:

loading said clean litter in the trailer portion of a tractor trailer truck;

locating said truck within said poultry facility with the rear portion of said truck adjacent the back wall of said facility;

moving said truck slowly forward and away from said backwall;

moving said clean litter along a bottom portion of said trailer toward a rear wall of said trailer discharging said clean litter from said trailer at a first location near said rear wall and outwardly of a left wall of said trailer;

discharging said clean litter from said trailer at a second location near said rear wall and outwardly of a right wall of said trailer;

rotating a first spreader at said first location in a counter clockwise direction;

rotating a second spreader at said second location in a clockwise direction; and controlling the relative speeds of said truck movement, said discharging of said clean litter and the speed of rotation of said first and second spreader so as to produce an even layer of said clean litter as a ground cover for said poultry facility.

11. Apparatus for spreading clean litter as a ground cover for a poultry facility comprising:

a vehicle for traversing a length of an poultry facility by positioning a rear portion of said vehicle adjacent a back wall of said facility moving said vehicle slowly forward and away from said backwall;

a vehicle mounted container for containing said clean litter, said vehicle mounted container comprising an open top for receiving said clean litter, a front wall, a rear wall, a first side wall, a second side wall, and a bottom, said vehicle mounted container having a centerline extending from said front wall to said rear wall;

first means adjacent the bottom of said vehicle mounted container for moving said clean litter along the bottom of said vehicle mounted container in a direction from said front wall toward said rear wall;

at least two openings provided adjacent the bottom of said vehicle mounted container and adjacent to or in said rear wall for permitting a clean litter to be discharged from said vehicle mounted container, said at least two openings being disposed so as to have a first opening disposed to a first side of said centerline and a second opening disposed to the second side of said centerline;

second means adjacent the bottom and rear wall of said vehicle mounted container for moving said clean litter toward said openings;

a first clean litter spreader located outside of said container and disposed to the first side of said centerline for receiving clean litter discharged from said first opening;

a second clean litter spreader located outside of said container and disposed to the second side of said centerline for receiving clean litter discharged from said second opening;

means for rotating said first and second clean litter spreaders in such a manner as to spread said clean litter in a pattern outwardly of said side walls and rearwardly of said rear wall, said pattern being of essentially even depth of clean litter covering essentially the entire width of the floor of said poultry facility in a single pass, said first clean litter spreader being rotated about an essentially vertical axis in a counter-clockwise direction and said second clean litter spreader being rotated about an essentially vertical axis in a clockwise direction; and hydraulic means for controlling the relative speeds of movement of said vehicle moving slowly forward and away from said backwall and said second means for moving said material with the speed of rotation of said first and second clean litter spreaders so as to spread an even layer of said clean litter in said poultry facility.

12. The apparatus for spreading clean litter as a ground cover for a poultry facility according to claim 11 further comprising:

means adjacent said rear wall for lifting and preventing compacting of said clean litter.

13. The apparatus for spreading clean litter as a ground cover for a poultry facility according to claim 12 wherein said clean litter lifting means comprises:

a plurality of vertically aligned rotatable bars each having a plurality of rods radially extending therefrom.

14. The apparatus for spreading clean litter as a ground cover for a poultry facility according to claim 11 wherein said means for moving said clean litter toward said openings comprises:

an auger having a first portion and a second portion, said first and second portions having opposite pitch such that rotation of said auger causes said clean litter to move toward said first and second side walls when said auger is rotated in a first direction and away from said first and second side walls when said auger is rotated in a second opposite direction.

15. The apparatus for spreading clean litter as a ground cover for a poultry facility according to claim 11 further comprising:

an opening in said rear wall for permitting clean litter to be discharged from said container; and a blower affixed to the outer surface of said rear wall for receiving clean litter discharged from said rear wall and spreading said clean litter outwardly of said container.

16. The apparatus for spreading clean litter as a ground cover for a poultry facility according to claim 11 wherein said vehicle mounted container is a trailer portion of a tractor trailer type truck, said vehicle is a tractor portion of a tractor trailer type truck, and wherein the height of said trailer is essentially equal to the cab portion of said tractor trailer, the height of both of which is lower than an overhead clearance of said poultry facility.

17. The apparatus for spreading clean litter as a ground cover for a poultry facility according to claim 12 wherein said tractor trailer truck includes a drive shaft and said hydraulic control means includes means for controlling the rotational speed of said drive shaft in such a manner as to move said truck in a forwardly or rearwardly direction during spreading of said clean litter relative to the speed of movement of said second means for moving said clean litter and the speed of rotation of said first and second clean litter spreaders.

18. The apparatus for spreading clean litter as a ground cover for a poultry facility according to claim 17, wherein said hydraulic control means further includes means for rotating an auger, means for operating said means first for moving said clean litter along the bottom of said vehicle mounted container, and means for rotating said drive shaft.

19. The apparatus for spreading clean litter as a ground cover for a poultry facility according to claim 11 wherein said first opening is through said first side wall and said second opening is through said second side wall.

\* \* \* \* \*